United States Patent

Eastcott et al.

[15] 3,692,153
[45] Sept. 19, 1972

[54] PNEUMATIC BRAKE ACTUATOR

[72] Inventors: Peter De Hertel Eastcott; William Herbert Jackson, both of Peterborough, Ontario, Canada

[73] Assignee: Canadian General Electric Company, Limited, Toronto, Ontario, Canada

[22] Filed: Jan. 29, 1971

[21] Appl. No.: 110,990

[30] Foreign Application Priority Data

April 14, 1970 Canada......................080,032

[52] U.S. Cl. ......................188/170, 92/63, 188/72.3
[51] Int. Cl. ..............................................F16d 65/24
[58] Field of Search................91/217; 92/52, 63–66, 92/113, 117 R, 130, 135; 188/170, 72.3

[56] References Cited

UNITED STATES PATENTS

| 2,342,750 | 2/1944 | Newell | 188/170 X |
| 2,584,191 | 2/1952 | Danly et al. | 188/170 |
| 3,159,247 | 12/1964 | Charlton | 188/170 |

Primary Examiner—Duane A. Reger
Attorney—Raymond A. Eckersley, Frank L. Neuhauser, Oscar B. Waddell and Joseph B. Forman

[57] ABSTRACT

A pneumatic brake actuator comprises a coaxial array of a disc-shaped brake shoe, a cylindrical shoe carrier supported for axial movement, a compression coil spring, a fixed cylindrical carrier, a ring diaphragm, a disc-like head, a nut, and a rod secured to the movable carrier and projecting axially therefrom through the spring and through axial openings in the fixed carrier, diaphragm, head and nut. The rod is guided for axial movement by a bearing surface in the opening of the fixed carrier. It is fitted into the opening in the head and its free end is threaded into the nut so as to compress the spring between the two carriers. The diagram is located between flat surfaces on the fixed carrier and the head and is secured to the head along its outer and inner edges. An opening is provided in the head for admitting compressed air into the space between the head and the diaphragm. In operation, the spring applies the brakes and the compressed air releases them.

7 Claims, 4 Drawing Figures

PATENTED SEP 19 1972

INVENTOR.
PETER DEH. EASTCOTT
WILLIAM H. JACKSON
BY

Patent Agent

PNEUMATIC BRAKE ACTUATOR

This invention relates to a pneumatic brake actuator, and in particular to an actuator well suited for use in the brakes of a friction mine hoist.

A friction or Koeppe hoist is essentially a large wheel or drum from which hang a number of steel ropes that support the conveyances. The wheel is fixed to a horizontal shaft which is driven by an electric motor for rotation in two bearings, one at each side of the wheel. A friction tread on the periphery of the wheel causes the ropes to follow rotation of the wheel and in so doing raise or lower the conveyances according to the direction of rotation. Since the wheel and the load thereon are heavy and usually unbalanced, very rugged and reliable brakes are required.

The object of this invention is to provide a rugged pneumatic brake actuator well suited for use in the brakes of a friction mine hoist, although not so limited.

According to the invention, the actuator comprises a first cylindrical carrier supported for axial movement, having a brake shoe on one end and a rod fixed to the other end so as to project axially from the carrier; a second coaxial cylindrical carrier spaced axially from the first carrier, supported by means of stationary structure for axial adjustment, having an axial bore through which the rod extends and is guided for axial movement, and having a flat surface on the end from which the free end of the rod projects; a coaxial disc-like head having a flat surface facing the flat surface on the second carrier in closely spaced parallel relation, and an axial bore through which the rod extends and supports the head; a ring diaphragm located between the two flat surfaces and secured to the head along its outer and inner edges; a compression coil spring surrounding the rod coaxial therewith; a nut threaded onto the free end of the rod and bearing against the outer side of the head for compressing the spring between the carriers; and an opening in the head for admitting compressed air inbetween the head and diaphragm. In operation, the spring applies the brakes and the compressed air release them.

An embodiment of the invention will now be described with reference to the accompanying drawings, in which.

Figure 1:
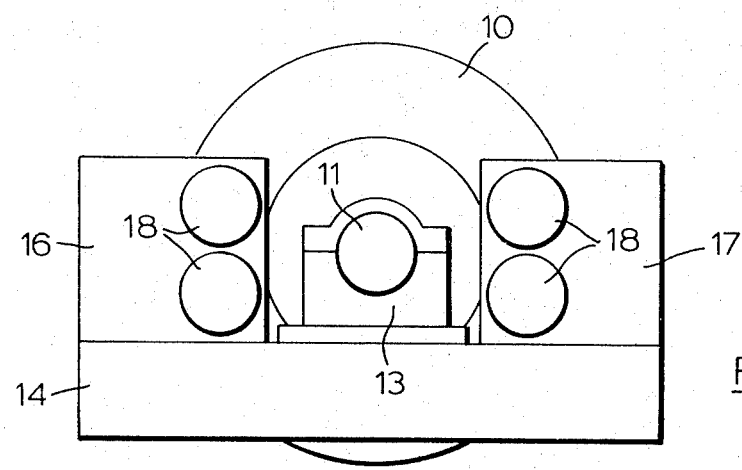
FIGS. 1 and 2 are profile and plan views respectively of a drive wheel and its supporting structure.
Figure 2:
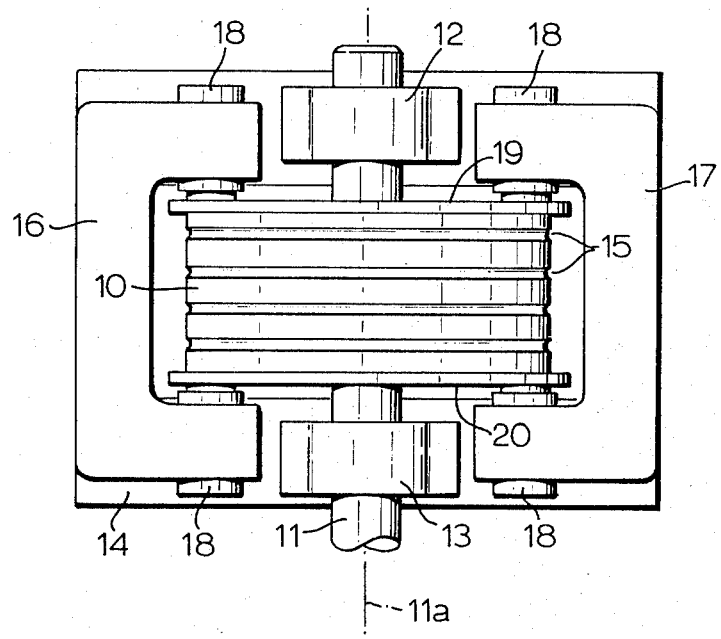

Referring now to FIGS. 1 and 2 there is shown a drive wheel 10 having a shaft 11 supported in bearings 12 and 13 for rotation on a horizontal axis 11a. The bearings are located close to the wheel, one on either side thereof, and are supported on a base 14 which in turn is supported on a suitable foundation. An electric motor mechanically coupled to the shaft at the end thereof shown broken may be used to drive the wheel so that the steel ropes running in grooves 15 in the friction tread on the periphery of the wheel raise or lower the conveyances in the mine shaft as the wheel turns. The two heavy U-shaped frames 16 and 17 axially spanning the wheel at diametrically opposite locations and resting on base 14 support eight brake actuators 18. When energized for braking the wheel, these actuators apply balanced braking forces to braking surfaces 19 and 20 on the opposite ends of the wheel. There may be more or less than eight actuators, e.g., two, four, 12, or 24, depending on hoist design.

Figure 3:
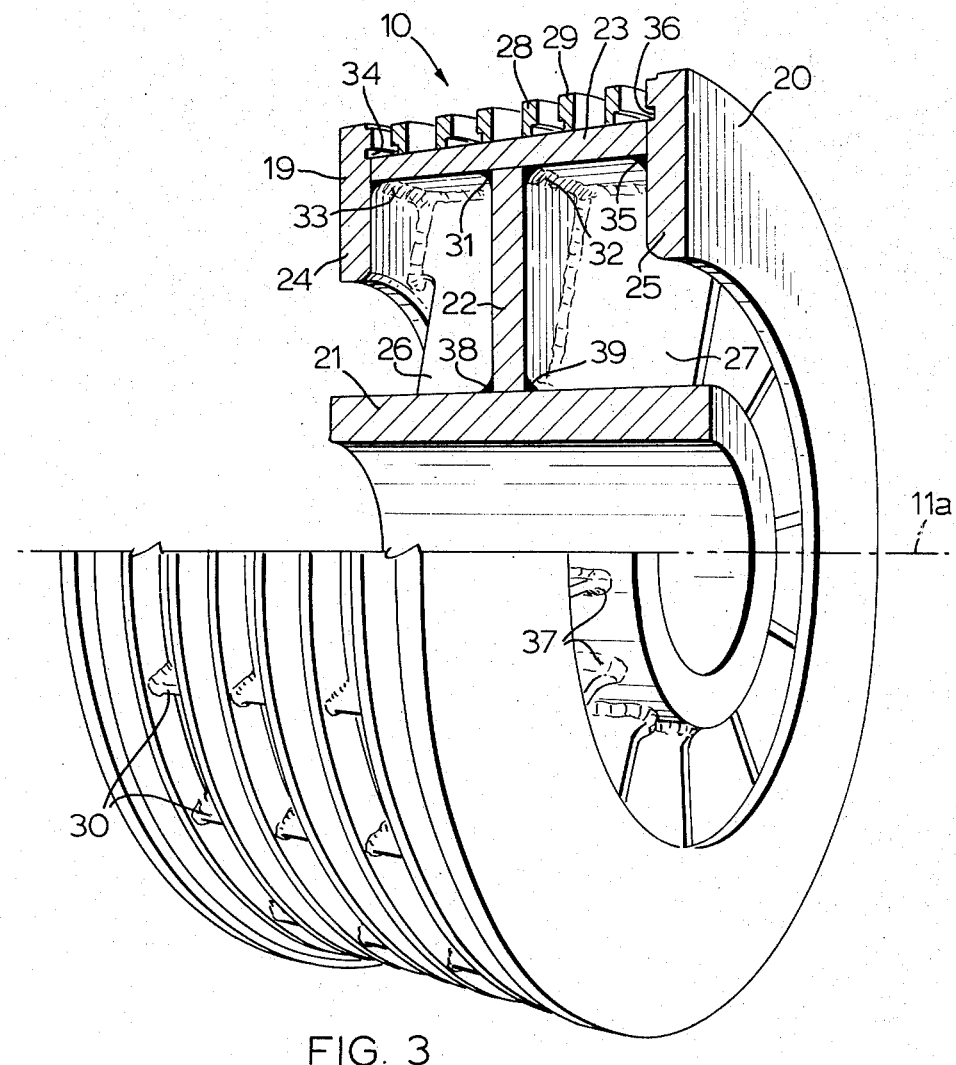
FIG. 3 is a perspective view of the wheel in quarter section.

The construction of a wheel will now be described with reference to FIG. 3. It is a welded structure consisting of a solid cylindrical hub 21, a flat ring or disc 22, a cylindrical rim 23, a pair of annular flanges 24 and 25, a plurality of ribs 26 and 27, four pairs of tread retaining flanges 28 and 29, and a plurality of reinforcing blocks 30. Ring 22 encircles the hub midway of its length with its flat sides at right angles to the axis of rotation 11a of the hub, and rim 23 encircles the ring coaxial with the axis of rotation. Annular flanges 24 and 25 abut the ends of the rim with their centers on the axis of rotation, and each one has a substantial portion projecting radially inward from the rim toward the hub, leaving a relatively large annular opening between the flange and the hub, and a portion projecting radially outward from the rim. The outer surfaces 19 and 20 of flanges 24 and 25 respectively are machined flat and smooth normal to the axis of rotation of the wheel, and are used as the braking surfaces. Ribs 26 and 27 are equally spaced radially around the hub, extending therefrom to the ring, rim and flanges with their flat sides directed axially.

Ring 22, flanges 24 and 25 and ribs 26 and 27 are flat, rigid members cut from a thick plate stock that can be welded, e.g., alloy low carbon steel plate. Rim 23 is shaped from a like material. Ring 22 is welded to rim 23 on both sides at 31 and 32; rim 23 is welded to flanges 24 and 25 at 33 to 36; and each one of the ribs 26 and 27 is welded on both sides at its junctures with the ring, rim and flanges. The welded structure may now be machined to an interference fit around a hub which has also been machined to receive the structure. The ring and ribs are then welded on both sides at all their junctures with the hub as indicated at 37, 38 and 39. Preferably, all the welds are continuous arc welds. They are readily made because the inner edges of flanges 24 and 25 are spaced for enough from the hub and the ribs, and the ribs far enough apart that a welder can easily get inside the wheel compartments and make the welds; there are no blind or inaccessible areas that cannot be easily welded. Preferably, the hub is forged from a high strength low carbon alloy steel. Tread retaining rings 28 and 29 are cut from steel plate and welded to the periphery of ring 23, after which blocks 30 are inserted at spaced intervals between the pairs of retaining rings and welded to the rings and rim. The tread receiving grooves defined by the pairs of rings 28, 29 may now be machined to the shape shown in FIG. 3. During the set-up for this machining operation, the outer faces of flanges 24 and 25 are machined smooth at 19 and 20 respectively and normal to the axis of rotation, and the hub bored coaxial therewith to the size necessary for an interference fit on shaft 11.

Figure 4:
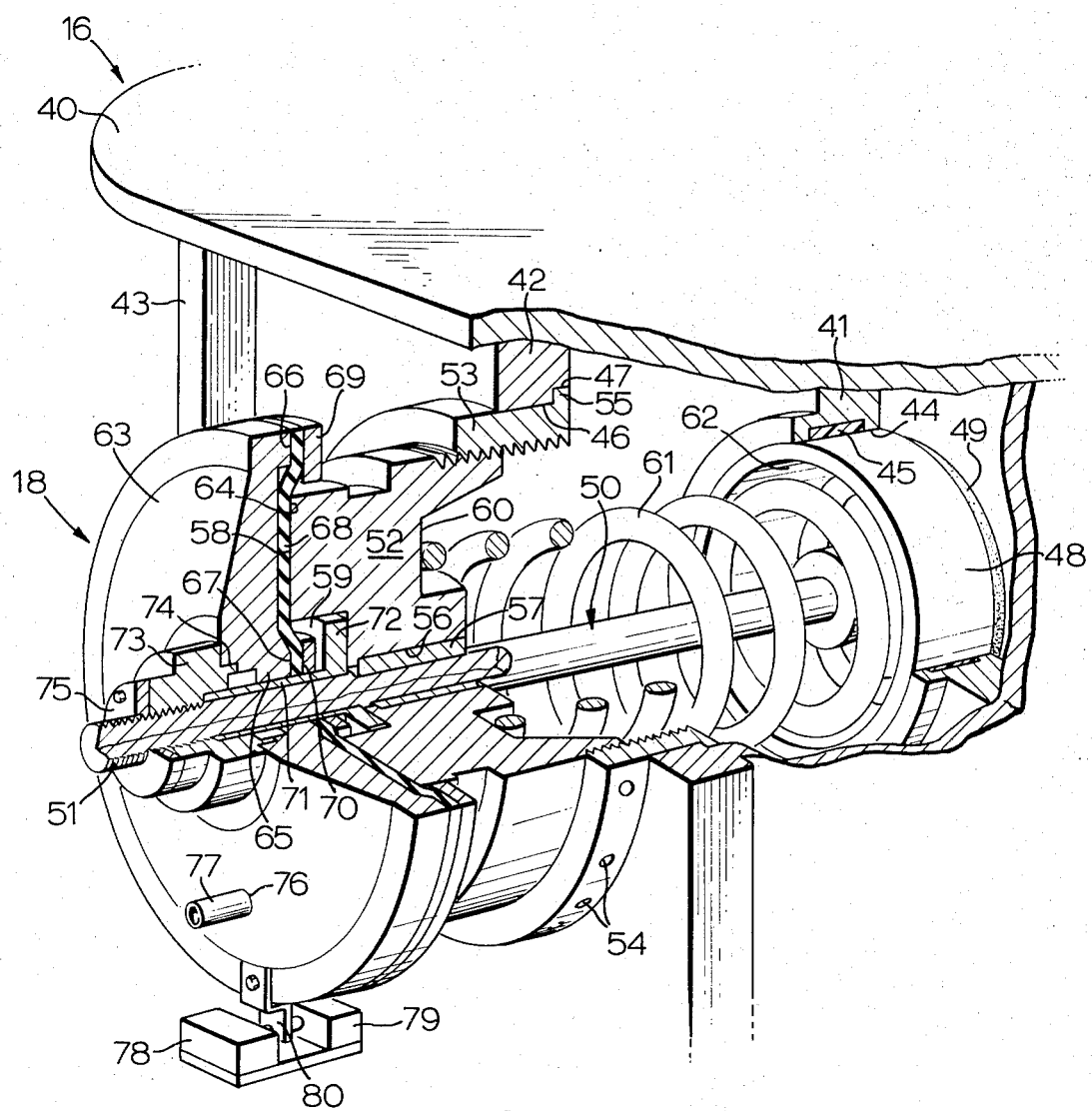
FIG. 4 is a perspective view of a brake actuator in quarter section.

Reference should now be made to FIG. 4 where there is shown a portion of frame 16 and one of the eight identical brake actuators 18. Frames 16 and 17 are box-type structures made from steel plates welded together. Each frame is in the general shape of a wide letter U lying on one side on base 14. It has a long base portion located directly opposite the periphery of the wheel and two short legs located directly opposite the braking surfaces 19 and 20 on the ends of the wheel. The two frames are alike structurally but of opposite hand, and are located diametrically opposite one another in the same relation to the wheel.

As best illustrated in FIG. 4, frame 16 comprises a pair of U-shaped plates positioned horizontally one above the other in spaced relation. The lower one of these plates rests on base 14 and is not shown in FIG. 4, but the upper plate is shown at 40. A pair of vertical plates 41 and 42 are located between the horizontal plates of each leg in spaced relation. A pair of vertical plates are located between the base portions of the horizontal plates in spaced relation, the outer one being shown at 43. The plates are all heavy gauge steel and they are welded together into a rigid frame structure. Frame 17 is made the same way.

Each leg of the U-shaped frames has mounting means for two actuators 18 (FIG. 1). Since all the actuators are alike, each one is mounted in the frame in the way shown in FIG. 4. Plate 41 has a flanged cylindrical opening 44 facing braking surface 20 and containing an antifriction bushing 45 made of a plastic such as polytetrafluoroethylene, and plate 42 has a somewhat larger cylindrical opening 46 in axial alignment with opening 44 and containing an annular recess 47 at the inner side of the plate. The axis of the two openings is normal to the braking surface on approximately the median thereof.

An actuator 18 will now be described with reference to FIG. 4. It has a front spring carrier 48 of cylindrical shape mounted for axial movement in bushing 45 and carries a flat brake shoe 49 on its end next to the braking surface on the wheel. An arrangement of a key and keyway in components 41 and 48 (not shown in FIG. 4) may be used to stop the carrier from rotating and yet allow it to move freely axially. Preferably, the end of carrier 48 next to the braking surface on the wheel is formed with a recessed surface that is circular, flat and parallel with the braking surface, and shoe 49 is a flat piece of brake lining fitted into the recess and secured to the flat surface. An example of a suitable shoe material is a high grade Johns Manville 160 material moulded into discs one inch in thickness and fitted into a recess one quarter inch in depth. A rod 50 is secured to the other end of the carrier coaxial therewith and projects therefrom through opening 46 and beyond plate 42. This rod has its free end threaded at 51. A rear spring carrier 52 is supported on plate 42 by means of a ring 53 threaded onto the inner end of the carrier and fitted snuggly into opening 46. The ring has an annular flange 55 which fits into recess 47, it is threaded internally for receiving the external thread on the carrier, and it can be rotated by means of a wrench which engages in one or more of the holes 54 in its periphery. The carrier is a solid cylinder having an axial bore 56 that contains an oilite bushing 57 through which rod 50 extends as a freely movable fit. Bore 56 is enlarged at the outer end 58 of the cylinder as indicated at 59. The inner end of the cylinder has an annular recess 60 for retaining one end of a compression coil spring 61 which surrounds rod 50 coaxial therewith and has its other end retained in an annular recess 62 in front carrier 48. Surface 58 on the outer end of carrier 52 is a flat smooth surface, preferably at right angles to the axis of rod 50. The actuator has a disc-like head 63 with a flat smooth inner surface 64 thereon facing surface 58 in spaced parallel relation therewith, and a central bore 65 coaxial with respect to rod 50. Surface 64 lies between a pair of annular flanges 66 and 67 respectively on the head. These flanges are coaxial with respect to rod 50, project axially from surface 64 a short distance, and are spaced far enough apart radially that the outer end 58 of carrier 52 is a clearance fit between them. A ring diaphragm 68 about the diameter of head 63 is located between surfaces 58 and 64 with its outer and inner edge portions overlaying the faces of flanges 66 and 67 respectively. The outer edge portion of the diaphragm is clamped to flange 66 by means of a ring 69 and a series of cap screws threaded into the head, and the inner edge portion to flange 67 by means of a ring 70 and another series of cap screws threaded into the head. The diaphragm is made from a strong, flexible, air tight material such as neoprene rubber and air tight joints are made with it at flanges 66 and 67. A sleeve 71 fitting snuggly into bore 65 in head 63 has a flange 72 on its inner end located in the bore enlargement 59 in carrier 52 and has its outer end located in a recess in a nut 73 threaded onto the end 51 of rod 50, this nut cooperating with the rod for securing the two carriers, spring and head together in an operative actuator assembly. This sleeve fits loosely around rod 50 and serves as a stop for carrier 52 so that the carrier surface 58 is always maintained at a definite minimum distance from surface 64, thereby preventing the squeezing of diaphragm 68 between these surfaces when spring 61 is fully extended. It also serves as an air in securing the head, rod and nut together into a rigid assembly. To further improve the structure of the assembly, the nut has an axial extension 74 that fits into an annular recess in the head. The nut completes the assembly of carriers, spring, rod and head and is used for compressing spring 61 as necessary for setting the spring force, after which it is locked to the rod by means such as indicated at 75. Head 63 contains a hole 76 into which a hose connection 77 is fitted for admitting air between the head and the diaphragm for operating the actuator. This will be compressed air from the mine source and it will be under the control of the hoist braking system.

The two adjustments possible will now be considered. Since the spring is used for applying the brakes, that is, forcing shoe 49 against the braking surface on the wheel, its compression must be set for a particular braking effort. Compressing or relaxing the spring is accomplished by tightening or loosening nut 73 as necessary, lock 75 being released during this operation. It will be noted that any changes in the position of nut 73 along rod 40 also changes the position of head 63, diaphragm 68 and sleeve 71 by the same amount. Sleeve 71 maintains a minimum preset distance between surfaces 58 and 64, a distance sufficient to provide a small clearance between the diaphragm and the surfaces.

The second adjustment concerns the setting of the brake shoe in relation to the braking surface on the wheel. During this adjustment the brake is usually released while the brake actuator is moved bodily in an axial direction by rotating ring 53 with the aid of a suitable wrench engaging the ring in a hole 54. As can be readily seen from FIG. 4, the ring is threaded over the inner end of carrier 52; therefore, by keeping the carrier from rotating while the ring is rotated makes the carrier move axially. This results in axial movement of the actuator bodily. This adjustment is made for the purpose of placing the brake shoe in a definite position in relation to its braking surface, as for example, at the time of installation and during maintenance to compensate for brake wear. Some means is provided for preventing carrier 52 from rotating when ring 53 is turned and for locking the carrier against either rotary or axial movement once the adjustment has been made. Various means for carrying out these functions are known, and none have been illustrated in FIG. 4 in the interest of keeping this figure from becoming any more complicated than it already is.

The brake actuator is so designed and set that its spring 61 applies the brake fully when there is no air between head 63 and diaphragm 68, the thrust of the spring on carrier 52 being transferred to plate 42 through ring 53 and the flange 55 thereon. To release the brake, compressed air is forced in between the head and the diaphragm by way of hose connection 77. This air forces the head and diaphragm apart, but since the diaphragm backs onto the end surface 58 of the stationary carrier 52, the head is driven in a direction away from the carrier, and in so moving it pulls carrier 48 and shoe 49 with it away from the braking surface against the force of spring 61. This further compresses the spring for applying the brakes again when the air is released from between the head and the diaphragm. During brake application or release, carrier 48 reciprocates in bushing 45 and rod 50 in bushing 57, both bushings serving as guides for the movable structure.

Two microswitches 78 and 79 are provided for each brake actuator and an arm 80 for operating them is fitted to head 63. The switches are mounted for adjustment on a bracket that is secured to carrier 52. Switch 78 monitors the movement of head 63 to ensure that the brake has released when the compressed air is applied. The corresponding switches of all the other brake actuators on the hoist brake are connected in series to give a brake release signal to the hoist controls. If all the actuators do not release within a given time after hoist movement is called for, the safety circuit is tripped. A fault finder for the brake release switches is provided in the air valve cabinet for checking operation of the switches and quickly locating a faulty switch.

Switch 79 on each actuator is operated only when the travel of head 63 becomes excessive, indicating a worn brake shoe, i.e. time for adjustment to restore correct operation. All these microswitches are also connected in series and to an alarm which warns the operator when adjustment is needed.

Preferably the actuators will be set for balanced braking forces on the wheel, that is, the braking forces applied to surface 19 by the actuators mounted in frame 16 will be substantially equally to the forces applied to surface 20. This applies also to the forces produced by the actuators in Frame 17. Balanced braking forces leaves the wheel free from axial thrust and twisting tendencies. The wheel itself is made stiff enough to withstand the squeezing forces applied axially to it by the brake actuators and its supporting structure strong enough to withstand unbalanced braking forces, should they occur. In the event that the supply of compressed air to the brake actuators fails, the springs in the actuators automatically apply the brakes. Hence they also serve the purpose of the well known falling weight system in maintaining the safety of the hoist.

What I claim as new and desire to secure by Letters Patent of the United States is:

1. A pneumatic brake actuator comprising a first cylindrical carrier supported for reciprocating movement on its axis; a brake shoe operated by said first carrier; a rod secured to said first carrier and projecting axially from one end thereof; a second cylindrical carrier spaced axially from said first carrier; means for supporting said second carrier on supporting structure; a coaxial bore in said second carrier through which said rod extends, said bore being adapted to provide a bearing surface for said rod for reciprocating movement thereof; a compression coil spring surrounding said rod in the axial space between said one end of the first carrier and one end of said second carrier; a diaphragm engaging surface on the other end of said second carrier; a disc-like head having a coaxial bore through which said rod extends, said bore in the head being adapted to provide support for said head on said rod; a diaphragm engaging surface on said head facing said diaphragm surface on the second carrier in closely spaced relation therewith; a ring diaphragm located between said two surfaces and secured along its outer and inner edges to said head; a collar secured to the free end of said rod and abutting said head so as to compress said spring between the two carriers; and an opening in said head for admitting compressed air inbetween the head and the diaphragm.

2. The actuator defined in claim 1 wherein stop means is provided for holding the spacing between the two diaphragm surfaces at a predetermined minimum value.

3. The actuator defined in claim 1 wherein said two diaphragm surfaces are flat surfaces normal to said axis.

4. The actuator defined in claim 1 wherein said collar is threaded onto said rod and is used for adjusting the compression of said spring.

5. The actuator defined in claim 1 wherein said means for supporting the second carrier on its supporting structure comprises means enabling axial adjustment of the actuator.

6. The actuator defined in claim 1 wherein said means for supporting the second carrier on its supporting structure comprises a ring threaded onto the carrier and held by the structure for rotation only, whereby the actuator is adjusted axially.

7. The actuator defined in claim 1 wherein the other end of said first carrier has a flat surface normal to said axis, and said brake shoe is a flat piece of brake lining secured to this surface.

* * * * *